3,847,972
Patented Nov. 12, 1974

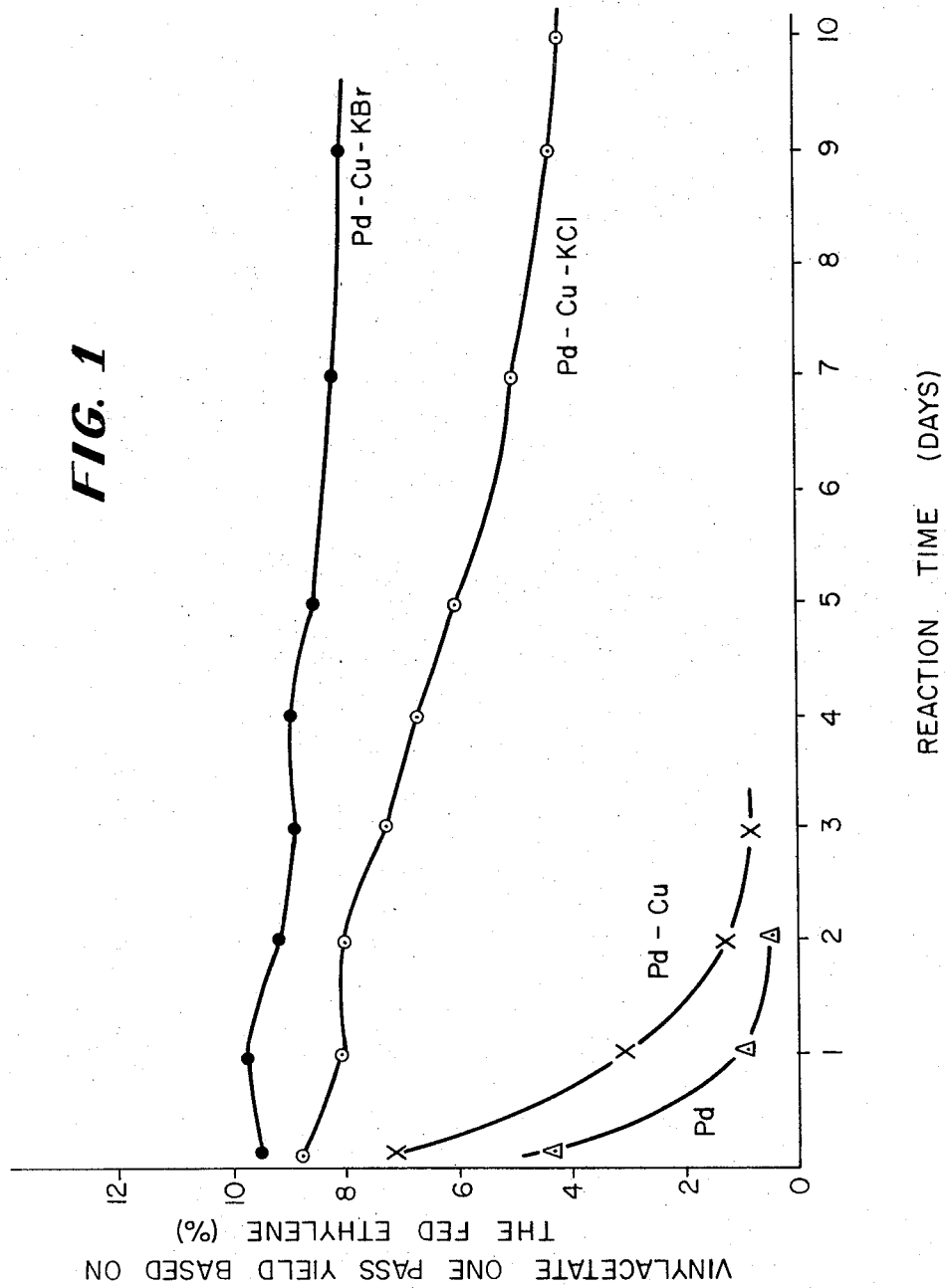

3,847,972
PRODUCTION OF VINYL ACETATE

Naoya Kominami, Tokyo, Hitoshi Nakajima, Ageo, Nobuhiro Tamura, Tokyo, and Kusuo Ohki, Yamatomachi, Japan, assignors to Asahi Kasei Kogyo Kabushiki Kaisha, Osaka, Japan
Continuation-in-part of application Ser. No. 733,284, May 31, 1968. This application June 17, 1971, Ser. No. 154,009
Claims priority, application Japan, June 12, 1967, 42/37,112
Int. Cl. C07c 67/04
U.S. Cl. 260—497 A        4 Claims

ABSTRACT OF THE DISCLOSURE

The production of vinyl acetate by subjecting a gas mixture containing ethylene, acetic acid and a molecular oxygen containing gas to a catalytic gas phase reaction at a temperature of from 50° to 300° C. in the presence of a catalyst composition consisting of (A) at least one metal of palladium, rhodium, ruthenium, platinum and iridium and (B) at least one compound of the bromides of sodium and potassium or together with (C) at least one of the metals, chlorides and oxides of copper, silver, zinc, cadmium, tin, lead, chromium, molybdenum, tungsten, iron, cobalt and nickel.

---

In evaluating the performance of a catalyst for use in a given reaction, the following factors are considered: the catalyst activity, selectivity and life. Activity is defined as one pass yield of vinyl acetate i.e. vinyl acetate/fed ethylene (mol percent). Selectivity is defined as vinyl acetate/ converted ethylene (mol percent). Life is defined as a time of the catalyst activity being reduced to half of that over 30 minutes after starting the reaction.

It has been found that the above-mentioned process has a disadvantage in that the activity of the catalyst tends to decrease gradually for a prolonged reaction period. More precisely, over the induction period there is a state in which the one pass yield and the selectivity of vinyl acetate are excellent. However, this state does not continue for a prolonged period and over 20 hours after starting the reaction the one pass yield and the selectivity of vinyl acetate decrease. Although it is still possible to practice the above-mentioned process commercially even with the use of catalysts having such tendency to decrease in activity, the process involves the provision of equipment and operations for regenerating catalysts or recharging fresh catalysts. In addition, the loss of catalysts in the regeneration operation is disadvantageous from the economic point of view since these catalysts are very expensive.

Table 1 below shows a comparison in the activity of the catalyst between the conventional catalyst and the catalyst of the present invention.

TABLE I

Change of one pass yield of vinyl acetate with elapse of time, percent based upon fed ethylene

| Catalyst | Initial | Reaction time | | | | | | | |
|---|---|---|---|---|---|---|---|---|---|
| | | 1 day | 2 days | 3 days | 4 days | 5 days | 7 days | 9 days | 10 days |
| Pd | 4.4 | 0.9 | 0.7 | | | | | | |
| Pd-Cu | 7.2 | 3.1 | 1.2 | 1.0 | | | | | |
| Pd-Cu-KCl | 8.7 | 8.1 | 8.0 | 7.3 | 6.7 | 6.0 | 5.1 | 4.4 | 4.2 |
| Pd-Cu-KBr | 9.5 | 9.8 | 9.1 | 8.9 | 8.9 | 8.5 | 8.1 | 8.0 | |

NOTE.—Reaction temperature=150° C.; Space velocity=150 hr.$^{-1}$; Composition of feed= $C_2H_4$:AcOH:$O_2$:$N_2$=3:1:1:3; Composition of catalyst=Pd metal content 2.0 wt. percent, Cu metal content 1.0 wt. percent, K-halide content 3.0 wt. percent; Carrier=$SiO_2$ gel.

This application is a continuation-in-part of applicant's copending application, Ser. No. 733,284 filed on May 31, 1968.

This invention relates to a process for producing vinyl acetate by gas phase reaction of ethylene, acetic acid and a molecular oxygen containing gas as starting materials.

The synthesis of vinyl acetate may be effected by subjecting a gas mixture containing ethylene, acetic acid and a molecular oxygen containing gas to a catalytic gas phase reaction at a temperature of from 50° to 300° C. in the presence of a catalyst composition containing of at least one of the metals palladium, platinum, rhodium, ruthenium and iridium as a main catalyst component, and at least one of the metals and oxides of copper, silver, zinc, cadmium, tin, lead, chromium, molybdenum, tungsten, iron, cobalt and nickel as a promotor, supported on a carrier (British Pat. No. 1,003,499).

From this table, it will be easily understood that the addition of KBr is remarkably effective particularly in long time operation. In other words, life of the present catalyst is very much improved over the conventional one and the extent of this improvement is much greater compared with the addition of KCl.

Another process proposed for producing vinyl acetate comprises subjecting a gas mixture containing ethylene, acetic acid and oxygen to a catalytic gas phase reaction at an elevated temperature in the presence of a palladium metal catalyst containing an alkali metal acetate and/or alkaline earth metal acetate (British Pat. No. 1,017,938).

Table 2 below shows a comparison in catalyst activity between the catalyst of British Pat. No. 1,017,938 and that of the present invention. As is clear from Table 2, the catalyst of the present invention is much more improved in catalyst activity.

TABLE 2

| Catalyst | One pass yield [1] of— | |
| --- | --- | --- |
| | Vinyl acetate (mol percent) | Acetaldehyde (mol percent) |
| (Palladium-silicat potassium acetate [2] | 6.2 | |
| (Palladium-potassium bromide-silica)[3] | 15.0 | Trace. |

[1] Based on the fed ethylene.
[2] Prepared on the basis of the description of British Pat. No. 1,017,938.
[3] Prepared as described in Example 1 of this invention.

NOTES:
Reaction conditions:
Reaction temperature, 150° C.
Space velocity, 100 hr.$^{-1}$.
Starting material composition: Ethylene:acetic acid:oxygen= 5:3:1 (by mol ratio).
Catalyst amount 30 cc.
Palladium metal content 2.0 wt. percent.
Potassium metal content 4.0 wt. percent (in each catalyst).

FIG. 1 graphically illustrates the outstanding improvement in catalyst life obtained according to the invention. Curve A shows the relatively steady performance of a Pd-Cu-KBr catalyst over a 10 hr. period. Curve B shows the drop in activity of a catalyst containing KCl. Curves C and D show the poor performance of a catalyst containing neither KBr or KCl. The data upon which the curves are based is shown in Table 1.

It is, therefore, an object of this invention to provide a process for the production of vinyl acetate from ethylene, acetic acid and a molecular oxyen containing gas in a catalytic gas phase reaction in the presence of a suitable catalyst composition with a very greatly prolonged life of catalyst, efficiently and economically.

According to the present invention a process for producing vinyl acetate comprises subjecting a gas mixture containing ethylene, acetic acid and a molecular oxygen containing gas to a catalytic gas phase reaction at a temperature of from 50° to 300° C. in the presence of a catalyst composition consisting of at least one of the metals of palladium, rhodium, ruthenium, platinum and iridium and at least one of the bromides of sodium and potassium supported on a carrier.

The atomic ratio of the metal of sodium bromide and potassium bromide to that of palladium, rhodium, ruthenium, platinum and iridium is in the range of 0.1–100:1, preferably 0.5–30:1 and most preferably 1–10:1. It has also been found valuable to utilize at least one of the metals, chlorides and oxides of copper, silver, zinc, cadmium, tin, lead, chromium, molybdenum, tungsten, iron, cobalt and nickel.

By utilizing these compounds, there have been observed such effects as to increase the one pass yield of vinyl acetate, to maintain the yield high for a long time and to inhibit the decrease in catalyst activity as is shown in Table 1.

The atomic ratio of the metal of these compounds to that of palladium, rhodium, ruthenium, platinum and iridium is preferably in the range of 0.01–100:1, and most preferably 0.1–30:1.

The catalysts employed in the process of this invention may be prepared by supporting, for example, at least one of palladium chloride, rhodium chloride, ruthenium chloride, chloroplatinic acid and iridium chloride and at least one of bromides of sodium and potassium, or together with at least one of ammonium chromate, ammonium molybdate, ammonium tungstate, the nitrates and chlorides of copper, silver, zinc, cadmium, tin, lead, chromium, molybdenum, tungsten, iron, cobalt and nickel simultaneously or successively on a carrier, followed by reducing them with hydrogen at appropriate temperatures. Alternatively, at least one of the metal salts and oxides of platinum, palladium, rhodium, ruthenium and iridium and at least one of those of copper, silver, zinc, cadmium, tin, lead, iron, cobalt and nickel and at least one of the bromides of sodium and potassium previously supported on a carrier by any of the conventional methods such as immersing method, mixing method, precipitating method, or calcining method may be reduced with hydrogen or other reducing agents such as hydrazine, formaldehyde or hydroquinone. The use of a carrier is not essential but is advantageous and preferable examples of carriers are active carbon, silica, silica-alumina and alumina. Silica and active carbon are preferred.

In practising the process of this invention, no particular range of mol ratio of ethylene of oxygen is necessarily required. A mol ratio of ethylene to oxygen of 1:1 to 50:1 is preferred. Likewise, although no particular range is imposed on the proportion of ethylene to acetic acid, a mol ratio of ethylene to acetic acid of 50:1 to 1:10 is preferred.

The space velocity of the gas mixture containing ethylene, acetic acid and molecular oxygen containing gas is preferably from 30 to 5000 hr.$^{-1}$, and most preferably ranges from about 50 to about 800 hr.$^{-1}$.

In the process of this invention, a reaction temperature is in the range of from 50° to 300° C., preferably from 80° to 200° C. At a temperature below 50° C. the rate of reaction is undesirably low, whereas at a temperature above 300° C. the side-reactions become active and the selectivity of vinyl acetate is accordingly remarkably reduced.

The ethylene used as starting material may contain a small amount of low saturated aliphatic hydrocarbons such as methane, ethane and propane.

Oxygen, pure or diluted with an inert gas such as nitrogen and carbon dioxide, or air may be employed as a molecular oxygen containing gas.

The reaction pressure may either be atmospheric or superatmospheric pressure so long as both the starting gases and reaction product gases are maintained at gas phase under the reaction conditions of the process of this invention.

Fixed, moving or fluidized bed systems may be employed in the reaction of the process of this invention.

This invention is further illustrated by the following examples which are in no way limiting upon the scope thereof. The yields of vinyl acetate and acetaldehyde given in the following examples are expressed in one pass yields based on the fed ethylene, respectively.

CONTROL 1

Palladium chloride, cupric chloride and potassium chloride were supported on granular silica gel by the immersion method, and this catalyst was diluted with quartz sand and charged into a heat-resistance glass tube of 30 mm. inside diameter, and hydrogen was passed into this catalyst at 300° C. to reduce the compounds to metallic form. The supported palladium chloride, cupric chloride and potassium chloride were 4.8 g., 10.9 g. and 14.7 g., respectively based on 100 g. of the carrier.

The reaction tube was maintained at 150° C. and a gas mixture consisting of ethylene, acetic acid, oxygen and nitrogen was passed through at a mol ratio of 10:1:2:1 at a space velocity of 150 hr.$^{-1}$. Over 30 minutes after starting the reaction (hereinafter referred to the initial period), the one pass yields of vinyl acetate and acetaldehyde were 4.7% and 1.3%, respectively and a trace of carbon dioxide was observed. Over 24 hours after starting the reaction, the one pass yields hardly changed and over one week after starting the reaction, the catalyst activity was reduced to two thirds of that of the initial period.

In the case where no potassium chloride was incorporated with the catalyst and the same reaction conditions were employed, the one pass yields of vinyl acetate and acetaldehyde were 3.6% and 1.6%, respectively in the initial period of the reaction, and the yields were reduced to about one-fifth of those of the initial period over 24 hours after the starting reaction.

EXAMPLE 1

Palladium chloride, cupric chloride and potassium bromide were supported on granular silica gel by the immersion method, and this catalyst was reduced at room temperature with hydrazine, washed with water and dried and charged into a reaction tube in the same manner as in Control 1. The supported palladium, copper and potassium bromide were 1.0 g., 0.6 g. and 2.7 g., respectively based on 100 g. of the carrier. A gas mixture consisting of ethylene, acetic acid, oxygen and nitrogen was passed through at a mol ratio of 3:1:1:3 at a space velocity of 300 hr.$^{-1}$ and in the initial period the one pass yield of vinyl acetate was 6.1% and only traces of acetaldehyde and carbon dioxide were observed. Over one day after starting the reaction the one pass yield of vinyl acetate was only reduced to about four fifths of that of the initial period and this catalyst activity was maintained over 168 hours even after starting the reaction.

EXAMPLES 2–3

Table 3 shows the catalyst activity and the half life period of the catalyst activity of each catalyst. Each catalyst was prepared by the same immersion method as in Control 1 unless expressly stated to the contrary. The same reactor as in Control 1 was employed.

What is claimed is:

1. In a process for producing vinyl acetate wherein a gas mixture containing ethylene, acetic acid, and molecular oxygen is reacted in a catalytic gas phase reaction at a temperature of 50° to 300° C. in the presence of a catalyst composition consisting essentially of metallic palladium used together with copper, and supported on an inert carrier, said composition containing potassium bromide in a ratio of 0.1–100:1 based on the amount of palladium, whereby the catalyst life is increased and the catalyst is more easily regenerated for reuse.

2. The process of claim 1 wherein the catalyst is supported on a carrier selected from the group consisting of active carbon, silica, silica-alumina and alumina.

3. In a process for producing vinyl acetate wherein a gas mixture containing ethylene, acetic acid, and molecular oxygen is reacted in a catalytic gas phase reaction at a temperature of 50° to 300° C. in the presence of a catalyst composition consisting essentially of metallic palladium used together with nickel, and supported on an inert carrier, said composition containing sodium bromide in a ratio of 0.1–100:1 based on the amount of the catalyst is more easily regenerated for reuse.
metal catalyst, whereby the catalyst life is increased and
4. The process of claim 3 wherein the catalyst is supported on a carrier selected from the group consisting of active carbon, silica, silica-alumina and alumina.

References Cited
UNITED STATES PATENTS

| | | | |
|---|---|---|---|
| 3,190,912 | 6/1965 | Robinson | 260—497 A |
| 3,300,528 | 1/1967 | Wakasa et al. | 260—497 A |
| 3,642,878 | 2/1972 | Mottern et al. | 260—497 A |

FOREIGN PATENTS

| | | | |
|---|---|---|---|
| 618,071 | 9/1962 | Belgium | 260—497 A |

LORRAINE A. WEINBERGER, Primary Examiner

R. D. KELLY, Assistant Examiner

U.S. Cl. X.R.

252—460, 474